(No Model.)
E. H. CASGRAIN.
VULCANIZER.
No. 535,672. Patented Mar. 12, 1895.
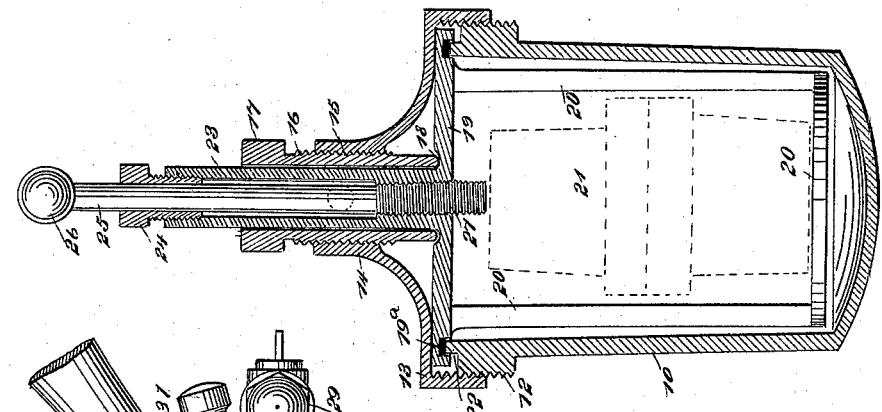
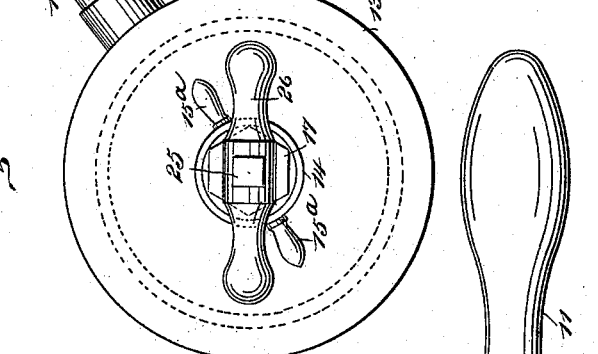
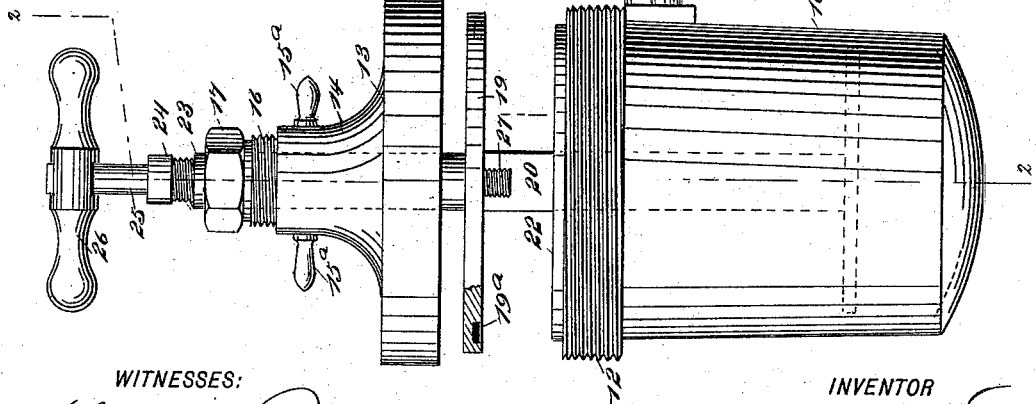
WITNESSES:
INVENTOR
BY
ATTORNEYS.

UNITED STATES PATENT OFFICE.

EDMOND H. CASGRAIN, OF QUEBEC, CANADA.

VULCANIZER.

SPECIFICATION forming part of Letters Patent No. 535,672, dated March 12, 1895.

Application filed November 15, 1894. Serial No. 528,944. (No model.)

*To all whom it may concern:*

Be it known that I, EDMOND H. CASGRAIN, of Quebec, in the Province of Quebec and Dominion of Canada, have invented certain new and useful Improvements in Vulcanizers, of which the following is a full, clear, and exact description.

My invention relates to improvements in vulcanizers such as are used in vulcanizing rubber, and particularly to hand vulcanizers adapted for use in vulcanizing small articles.

The object of my invention is to produce a simple vulcanizer which is possessed of great strength, and which is constructed in such a way that the cover and mold may be very quickly adjusted, the cover afterward quickly fastened so as to be absolutely tight, and the mold compressed after it has been sufficiently heated.

To these ends my invention consists of certain features of construction and combinations of parts, which will be hereinafter described and claimed.

Reference is to be had to the acccompanying drawings forming a part of this specification, in which similar figures of reference indicate corresponding parts in all the views.

Figure 1 is a side elevation of my improved vulcanizer, with parts in section and with the outer and inner cover raised. Fig. 2 is a vertical section on the line 2—2 of Fig. 1, and with both covers fastened in place; and Fig. 3 is a plan view of the vulcanizer.

The vulcanizer is provided with a pot 10 of the ordinary kind, which is capable of withstanding heat and has sufficient strength to resist the internal pressure which may be brought to bear on it, this pot having the customary handle 11 and threaded exterior top ring 12 to which the cover 13 may be screwed, and this outer cover 13 has a central raised portion 14 on which are handles 15ª, and which is internally screw threaded, as shown at 15 in Fig. 2, so as to fit the outer thread of the sleeve 16 which is provided with a top head 17, squared to receive a wrench and enable it to be forced downward. The lower end of the sleeve 16 fits in a groove 18 in the inner cover or cover plate 19, which carries the yoke 20 of substantially the usual kind, this yoke extending down into the pot 10 so as to carry the mold 21 shown by dotted lines in Fig. 2.

The cover plate or inner cover 19 is circular and is provided with an annular groove 19ª on its under side, which is suitably packed and is adapted to fit on the projecting upper edge of the pot 10, so that when the cover plate is forced downward a perfectly tight joint is effected.

The sleeve 16 is smooth within, and extending through it is the hollow stem 23 of the cover plate 19, this stem having at the top a bored plug 24 which screws into the stem and which serves as a guide for the spindle 25 which extends downward through the plug and stem and is at the top provided with a handle 26, while its lower end is screw threaded, as shown at 27, so as to fit a corresponding threaded portion of the stem 23. The spindle 25 extends downward through the cover plate 19 and is adapted to impinge on the mold, o that after the cover is tightened down and the mold is heated it may be compressed to any desired extent.

The vulcanizer is provided with the customary thermometer 28 which is inclosed in a case 29 and connects with the interior of the pot by a pipe 30 so that, by reference to the thermometer the internal temperature of the pot may be determined. The pot has also the customary safety valve 31. When the vulcanizer is used the mold 21 to be vulcanized is placed in the yoke 20 and the cover plate 19 and cover 13, together with the parts which they carry, are placed over the pot and the cover 13 is, by means of the handles 15ª, turned so as to be screwed to the ring 12, thus fastening all the parts in position. The sleeve 16 is then turned down by means of a wrench which is applied to the head 17 and the cover plate 19 is thereby forced tightly down upon the pot, hermetically sealing the latter. When the mold has been sufficiently heated, the spindle 25 is turned down so as to properly compress the mold 21.

It will be seen that the vulcanizer may be easily taken apart, quickly adjusted, that an easy means is provided for hermetically sealing it, and that a convenient and positive device is used to compress the mold.

Having thus described my invention, I claim as new and desire to secure by Letters Patent—

1. The combination, with a pot, of an inner cover fitting on the top and provided with a stem, a sleeve surrounding the stem and engaging the said cover, and an outer cover through the central portion of which the sleeve passes, substantially as described.

2. The combination with the pot, of the outer cover thereon, and the cover plate fitting the pot top within the outer cover, the yoke carried by the cover plate, the sleeve threaded into the outer cover and impinging on the cover plate, the hollow stem secured to the cover plate and extending through the sleeve, and the screw spindle extending downward through the stem and cover plate, substantially as described.

3. The combination, with the pot, and the outer cover threaded thereon, of the cover plate having an annular flange to fit the top of the pot, the mold carrying yoke on the cover plate, the upwardly extending stem on the cover plate, the threaded sleeve encircling the stem and extending through the outer cover, and the spindle extending downward through the stem and cover plate, substantially as described.

4. The combination, with the pot, the outer cover, the cover plate within the pot top and carrying a yoke beneath it, and the vertical stem on the cover plate, of the sleeve encircling the stem and threaded to fit within the cover, a guide plug at the upper end of the stem, and the screw spindle extending through the plug and threaded in the lower end of the stem, substantially as described.

EDMOND H. CASGRAIN.

Witnesses:
H. G. CARROLL,
WM. DOYLE.